US009965062B2

(12) United States Patent
Sala

(10) Patent No.: US 9,965,062 B2
(45) Date of Patent: May 8, 2018

(54) VISUAL ENHANCEMENTS BASED ON EYE TRACKING

(71) Applicant: MICROSOFT TECHNOLOGY LICENSING, LLC, Redmond, WA (US)

(72) Inventor: Pablo Luis Sala, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 87 days.

(21) Appl. No.: 13/911,867

(22) Filed: Jun. 6, 2013

(65) Prior Publication Data

US 2014/0361971 A1 Dec. 11, 2014

(51) Int. Cl.
*G09G 5/00* (2006.01)
*G06F 3/041* (2006.01)
*G06F 3/01* (2006.01)

(52) U.S. Cl.
CPC .............. *G06F 3/041* (2013.01); *G06F 3/013* (2013.01); *G06F 2203/04806* (2013.01)

(58) Field of Classification Search
CPC ...................... G06F 3/013; G06F 3/041; G06F 2203/04806; G06F 3/017; G06K 9/0061
USPC .......... 345/661, 156, 589; 707/737; 715/800
See application file for complete search history.

(56) References Cited

U.S. PATENT DOCUMENTS

| | | | |
|---|---|---|---|
| 6,421,064 B1 | 7/2002 | Lemelson et al. | |
| 7,429,108 B2 | 9/2008 | Rosenberg | |
| 2007/0164990 A1* | 7/2007 | Bjorklund et al. | 345/156 |
| 2010/0226535 A1 | 9/2010 | Kimchi et al. | |
| 2010/0295774 A1 | 11/2010 | Hennessey | |
| 2011/0006978 A1 | 1/2011 | Yuan | |
| 2011/0029918 A1* | 2/2011 | Yoo | G06F 3/017 715/800 |
| 2011/0254865 A1* | 10/2011 | Yee et al. | 345/661 |

(Continued)

FOREIGN PATENT DOCUMENTS

| | | |
|---|---|---|
| CN | 102834789 A | 12/2012 |
| GB | 2490864 A | 11/2012 |
| WO | 2010118292 A1 | 10/2010 |

(Continued)

OTHER PUBLICATIONS

"Fujitsu Develops Eye Tracking Technology", Retrieved at <<http://www.fujitsu.com/global/news/pr/archives/month/2012/20121002-02.html>>, Oct. 2, 2012, pp. 4.

(Continued)

*Primary Examiner* — Kumar Patel
*Assistant Examiner* — Kuo Woo
(74) *Attorney, Agent, or Firm* — Alleman Hall Creasman & Tuttle LLP

(57) ABSTRACT

Embodiments are disclosed that relate to selectively enhancing content displayed on a display device. For example, one disclosed embodiment provides a method comprising tracking a gaze location at which a gaze of a user intersects the graphical user interface, and upon detecting a gaze pattern that meets a defined gaze pattern condition indicative of difficulty in perceiving an item at the gaze location, displaying the item in at the gaze location a visually enhanced form via a user interface object displayed separately from the item at the gaze location.

20 Claims, 11 Drawing Sheets

(56) References Cited

U.S. PATENT DOCUMENTS

2014/0181106 A1* 6/2014 Horowitz ............... 707/737
2014/0247273 A1* 9/2014 Rosen ............ G06K 9/0061
                                                              345/589

FOREIGN PATENT DOCUMENTS

WO          2013033842 A1      3/2013
WO          2013059647 A1      4/2013

OTHER PUBLICATIONS

Farid, et al., "Computer Display Control and Interaction Using Eye-Gaze", Retrieved at <<http://www.cs.rhul.ac.uk/home/fionn/papers/fm6.pdf>>, In Journal of the Society for Information Display, vol. 10, Issue 3, Sep. 2002, pp. 13.

Buscher, et al., "Eye Tracking Analysis of Preferred Reading Regions on the Screen", Retrieved at <<http://data.text20.net/documentation/paper.readingregions.pdf>>, In Proceeding of Extended Abstracts on Human Factors in Computing Systems, Apr. 10, 2010, pp. 6.

"International Search Report & Written Opinion for PCT Patent Application No. PCT/US2014/040584", dated Sep. 17, 2014, 9 Pages.

"Office Action Issued in European Patent Application No. 14737366.6", dated Aug. 25, 2017, 9 Pages.

"First Office Action and Search Report Issued in Chinese Patent Application No. 201480032122.7", dated Sep. 30, 2017, 14 Pages.

\* cited by examiner

VISUAL ENHANCEMENTS BASED ON EYE TRACKING

BACKGROUND

Items displayed on a graphical user interface may at times be difficult for users to perceive. For example, text may be displayed in a color having a low contrast relative to a background color, or in a font that is small for a particular display screen size. Other types of displayed information may suffer similar problems. As such, computing devices may offer various ways for user to modify the appearance of displayed items. For example, users may be able to increase the size of text, zoom in on displayed images, change colors of displayed items, and take other such actions to enhance a visibility of a user interface item.

SUMMARY

Embodiments are disclosed that relate to automatically visually enhancing items displayed on a display device. For example, one disclosed embodiment provides a method comprising tracking a gaze location at which a gaze of a user intersects an item, and upon detecting a gaze pattern that meets a defined gaze pattern condition indicative of difficulty in perceiving an item at the gaze location, displaying the item at the gaze location in a visually enhanced form via a user interface object displayed separately from the item at the gaze location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, computing devices may offer various ways for users to modify the appearance of items displayed on a graphical user interface. The tools for making such modifications are generally invoked intentionally by users. For example, if a user of a laptop computer is struggling to read small text, the user may select a font size adjustment tool from a menu. Likewise, if a user of a smart phone is struggling to view a user interface item, the user may use a stretch gesture or the like to view the item at a higher magnification.

When a user struggles to view a user interface item, the visual struggle may have associated gaze movement characteristics that are detectable via gaze tracking. Thus, embodiments are disclosed that relate to automatically enhancing user interface items displayed on a display device based upon eye gaze motion characteristics detected via gaze tracking.

Figure 1:
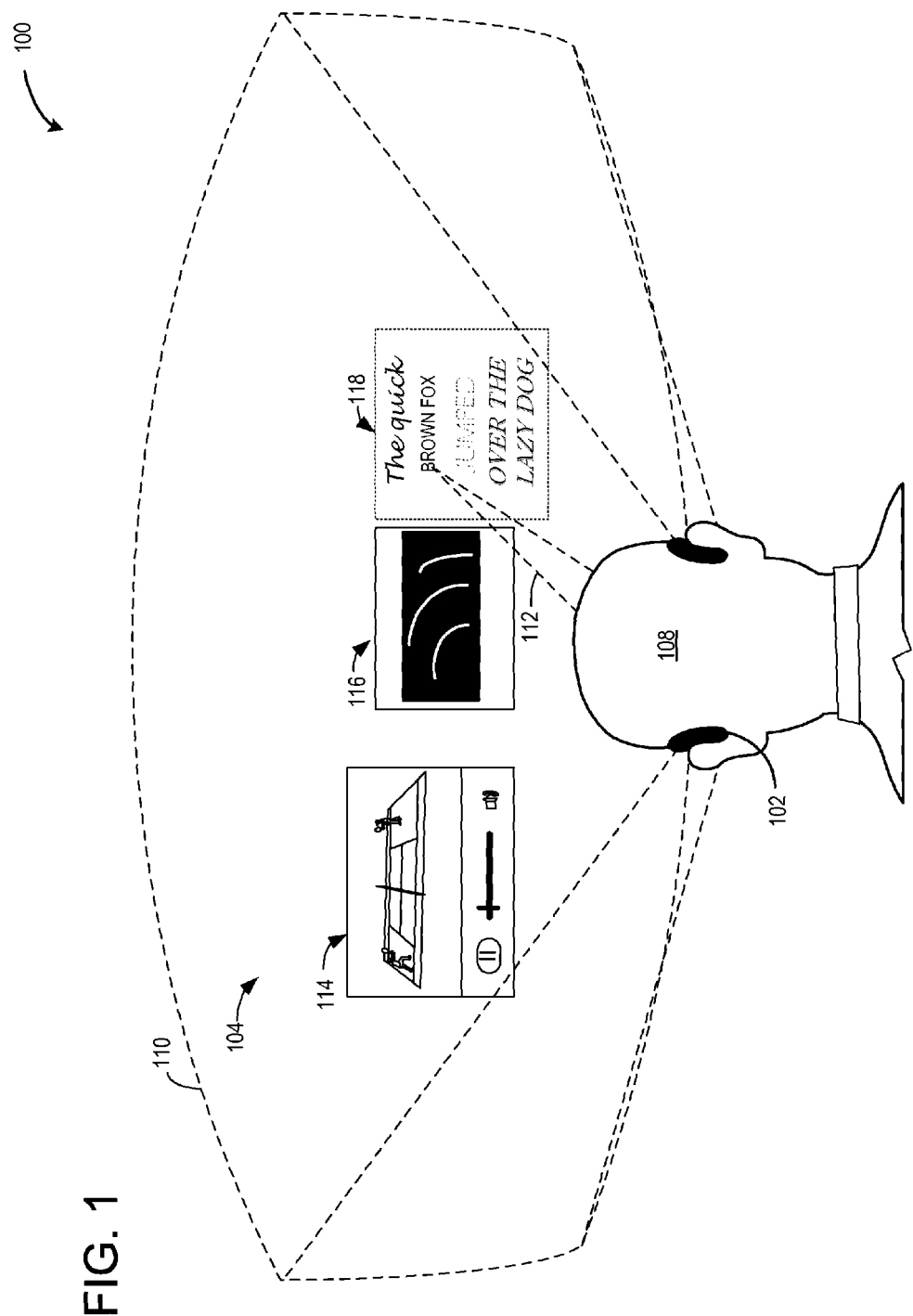
FIG. 1 schematically shows an example display device and graphical user interface in accordance with an embodiment of the present disclosure.

FIG. 1 shows an example use environment 100 comprising a computing device 102 displaying a graphical user interface 104. While shown in the context of a head-mounted display device in FIG. 1, it is understood that any other suitable computing device may be used, including but not limited to a smart phone, a personal computer, a game console, a mobile computing device, a server computing device, a tablet, etc. Likewise, while graphical user interface 104 is shown in the form of a holographic user interface, a head-mounted display also may be used to augment an appearance of a graphical user interface displayed on a separate display device (e.g. a computer monitor, television, smart phone, tablet, laptop computer screen, etc.). FIG. 1 also shows a user 108 interacting with the graphical user interface 104 via gaze. Items within a field of view 110 of the head-mounted display device are illustrated as seen through the head-mounted display device.

As described in more detail below, the computing device 102 may comprise a gaze detection subsystem configured to detect a gaze 112 of the user 108 and determine a location at which the gaze 112 of the user intersects the graphical user interface 104. The gaze detection subsystem may perform these operations periodically to output a periodically updated position signal. The graphical user interface 104 is shown as displaying a video item 114, an image item 116, and a text item 118 for the purpose of example, but it will be understood that the graphical user interface may display any other suitable item or items. It will be understood that the term "user interface item" and the like refer to any item displayed on a display device that may be visually enhanced as described herein.

Changes in the periodically updated position signal from the gaze tracking subsystem over time may allow recognized gaze patterns to be detected. For example, as mentioned above, gaze patterns may be used to detect whether a user is struggling to view a user interface item. As a more specific example, a user may read over the same sentence multiple times, dwell at a portion of an image for a relatively longer duration, move at a lower speed than usual when reading, and/or perform other such eye gaze behaviors that are detectable as motion conditions indicative of the user struggling to view a user interface item. Accordingly, the user's gaze path may be analyzed to identify gaze patterns associated with difficulty in perception. Any suitable methods may be used to identify such gaze patterns. Examples include, but not limited to, comparing gaze path data to pre-defined gaze patterns, comparing gaze path data to prior patterns of the current user (as learned via calibration and/or observation during ordinary use), and/or evaluating gaze path data via the use of classification functions trained with training data comprising gaze patterns corresponding to known conditions.

The computing device 102 further may be configured to determine contextual features associated with item(s) at the gaze location, and use contextual information as a filter or filters in determining whether a user is having difficulty viewing a user interface item. Any suitable contextual information may be utilized. For example, the computing device may determine a type of user interface item in the gaze location. Examples of item types include, but are not limited to, text, video items, image items, executable items, icons, action items (e.g. user interface control items), and/or any suitable type of item.

As an example of how contextual information may be used to distinguish eye patterns, a back-and-forth eye pattern that may indicate difficulty in reading an item may not indicate similar difficulties for other types of content. As a more specific example, a user viewing a video item may be expected to exhibit a gaze pattern that follows one or more objects within the video. In the illustrated example, video item 114 comprises a tennis match. As such, the gaze of the user may traverse the same location multiple times as the user changes view from player to player. In this example, the repetitive gaze pattern is not likely to be indicative of a struggle in perceiving the item. Contextual information may be utilized in other manners as well. For example, different visual enhancements may be applied depending upon a type of item at the gaze location.

As another example, as the user gazes at text item 118, the text item may be evaluated to determine characteristics such as a font, font size, font color, background color, font style (e.g., bold, italic, underline, subscript/superscript, strikethrough, embossed, outline, gradient, etc.), and other such formatting. The text item also may be evaluated to determine characteristics of the text content, such as a number of words in the gaze location, a complexity of words in the gaze location, etc.

Other types of items than text may be evaluated for a different set of characteristics than text. For example, a video item may be evaluated for factors such as an overall size of the displayed video content, a resolution of the content, and/or a level of complexity associated with moving images depicted therein. As a more specific example, a video with much high spatial frequency image data, and/or a large variation in image data between frames, may be determined to have a higher level of complexity than a video lacking such features.

Such features and characteristics may be used in any suitable manner to help determine and/or weigh the likelihood that a detected gaze pattern is indicative of a user having difficulty perceiving a user interface item. For example, in some embodiments, such information may be used to determine a confidence score that indicates a likelihood that the detected gaze pattern is indicative of such difficulties. In the context of text items, a contextual filter may specify a first confidence score for a smaller font size and a second confidence score for a larger font size, wherein the first confidence score represents a higher likelihood that the user is having difficulty perceiving an item than the second confidence score. The confidence score determined for a detected gaze pattern may be compared to a threshold score condition (e.g. below or above a threshold score) in order to determine whether a context-based gaze pattern condition is met. It will be understood that a confidence score may be based on any suitable characteristic or characteristics associated with the item.

In some instances, the user's gaze 112 may be determined to be directed to multiple items or item types. In such instances, the multiple items or item types may be prioritized, weighted to have different influences on a confidence score, or otherwise separately considered to assist in select a type for evaluation and potential modification.

In response to determining that a defined gaze pattern condition is met, the computing device 102 may visually enhance an appearance of the item at the gaze location. Any suitable visual enhancement may be applied, including but not limited to changes to color, size, font type, font style, gradient, sharpness, contrast, etc. For example, referring to FIG. 2, if it is determined that the "brown dog" text to which the user's gaze 112 is directed has a font size that is smaller than a threshold and/or has a confidence score that is below a threshold, then a font size of the text may be increased, or the text may otherwise be displayed as having a magnified appearance in the user interface object.

Figure 2:
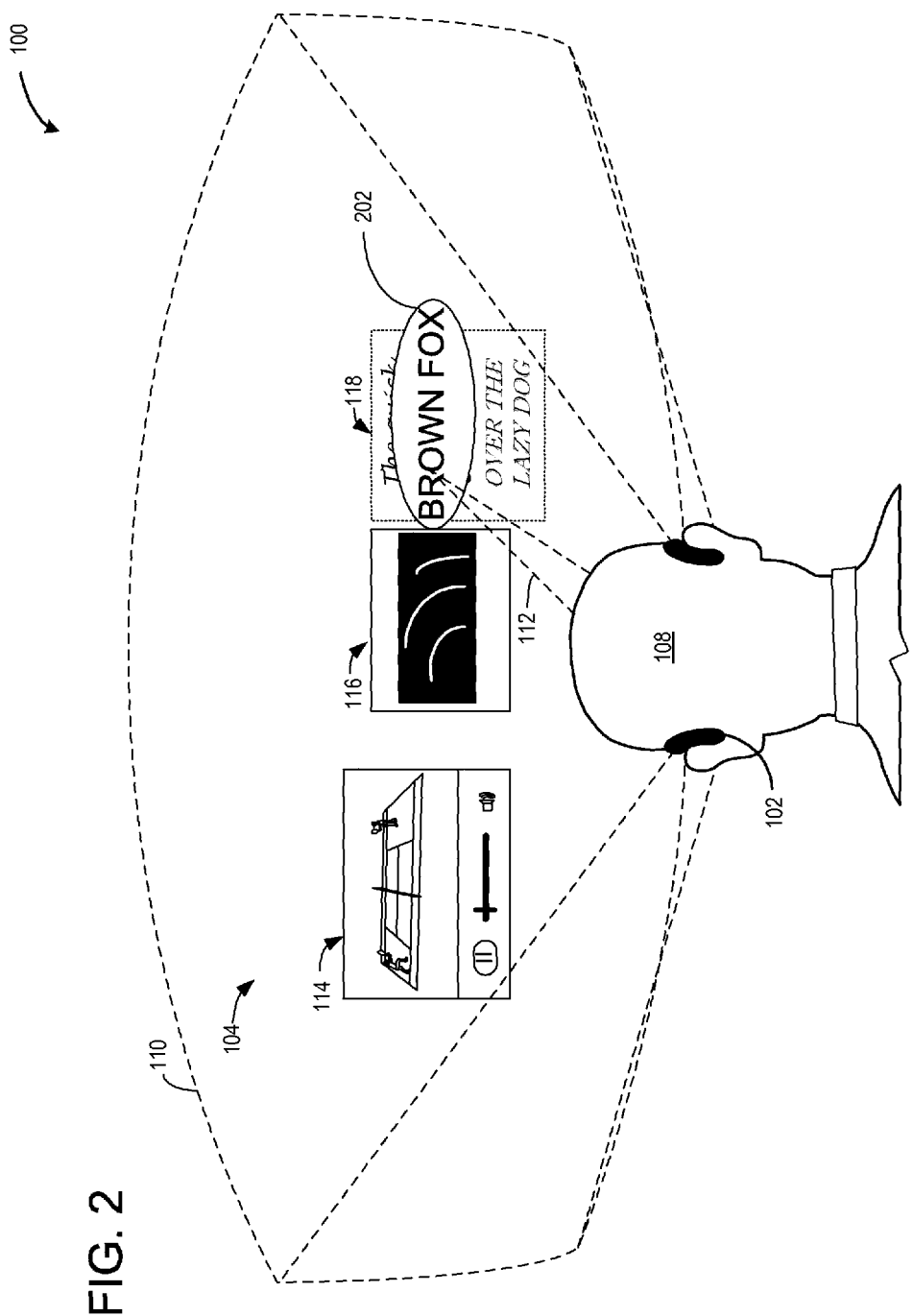
FIGS. 2-5 schematically show examples of visually enhancing items of the graphical user interface of FIG. 1 in accordance with embodiments of the present disclosure.

Visual enhancements to a user interface item may be displayed in any suitable manner. For example, in some embodiments, a visually enhanced version of the item may be displayed in a user interface object located over (e.g. at a higher z-order position than) the item, or otherwise located separately from the item. FIG. 2 shows an example of such a user interface object 202 as a text oval in which the text is displayed in the larger font, but it will be understood that such a user interface object may have any other suitable appearance.

Figure 3:
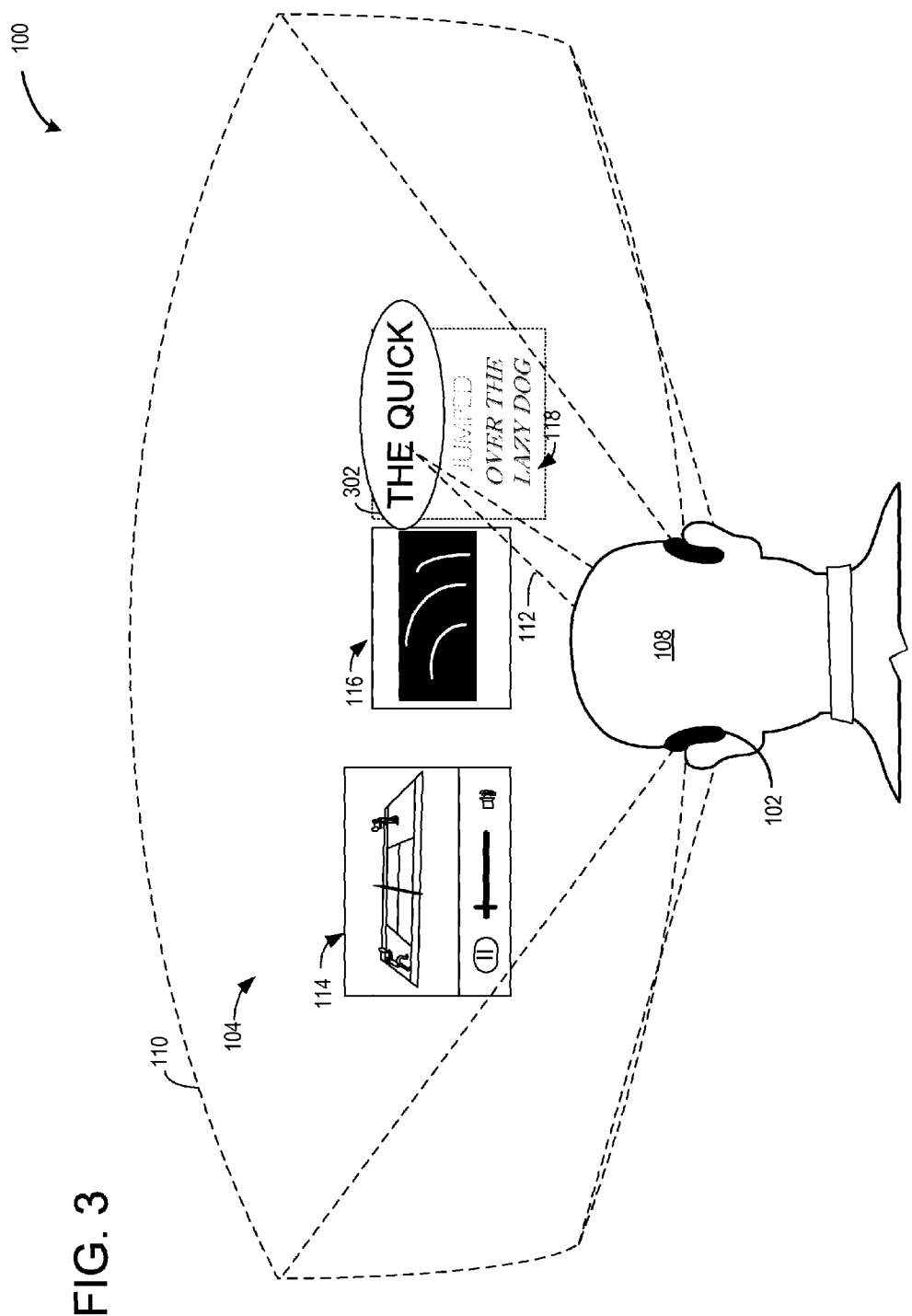
Figure 4:
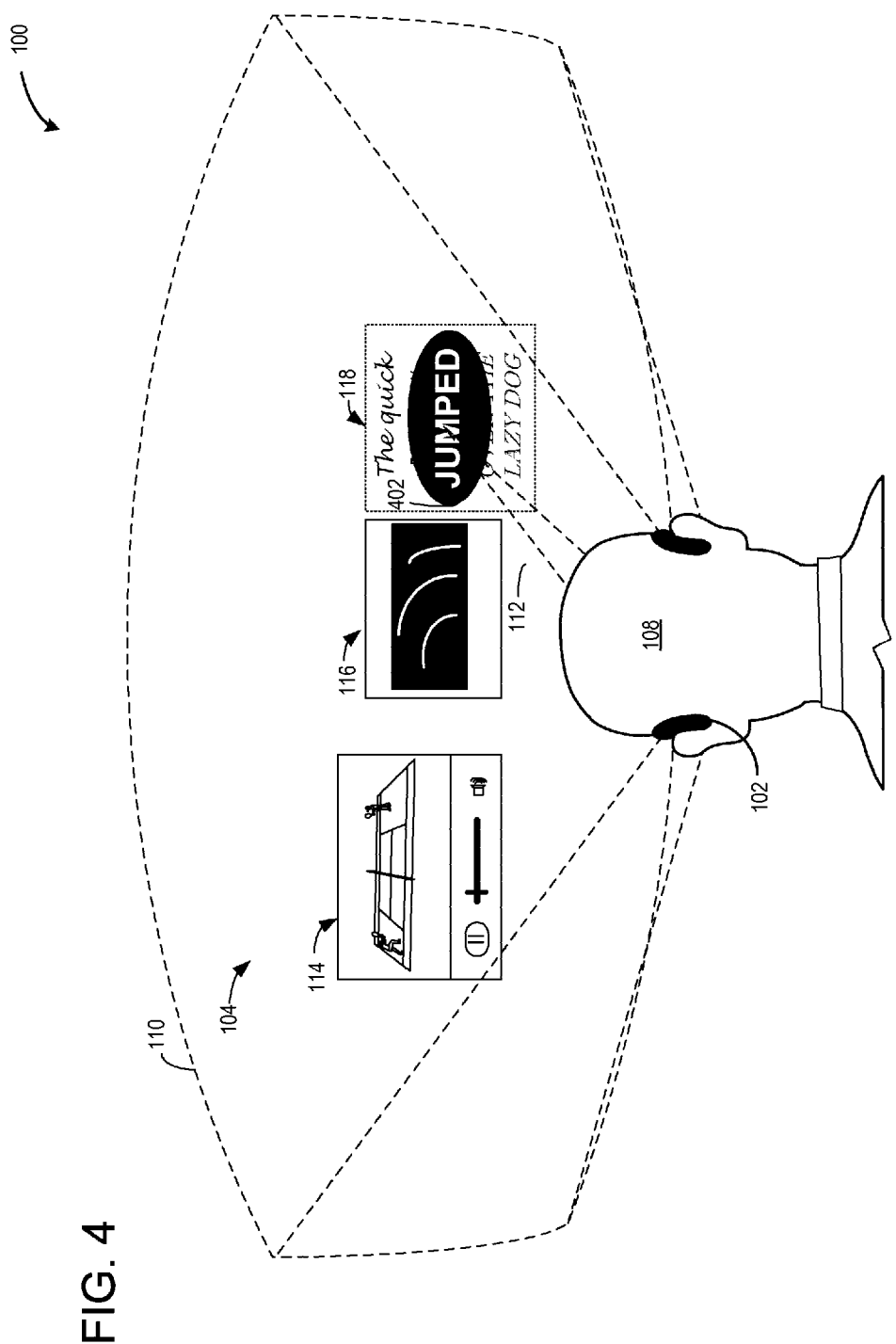
Figure 5:
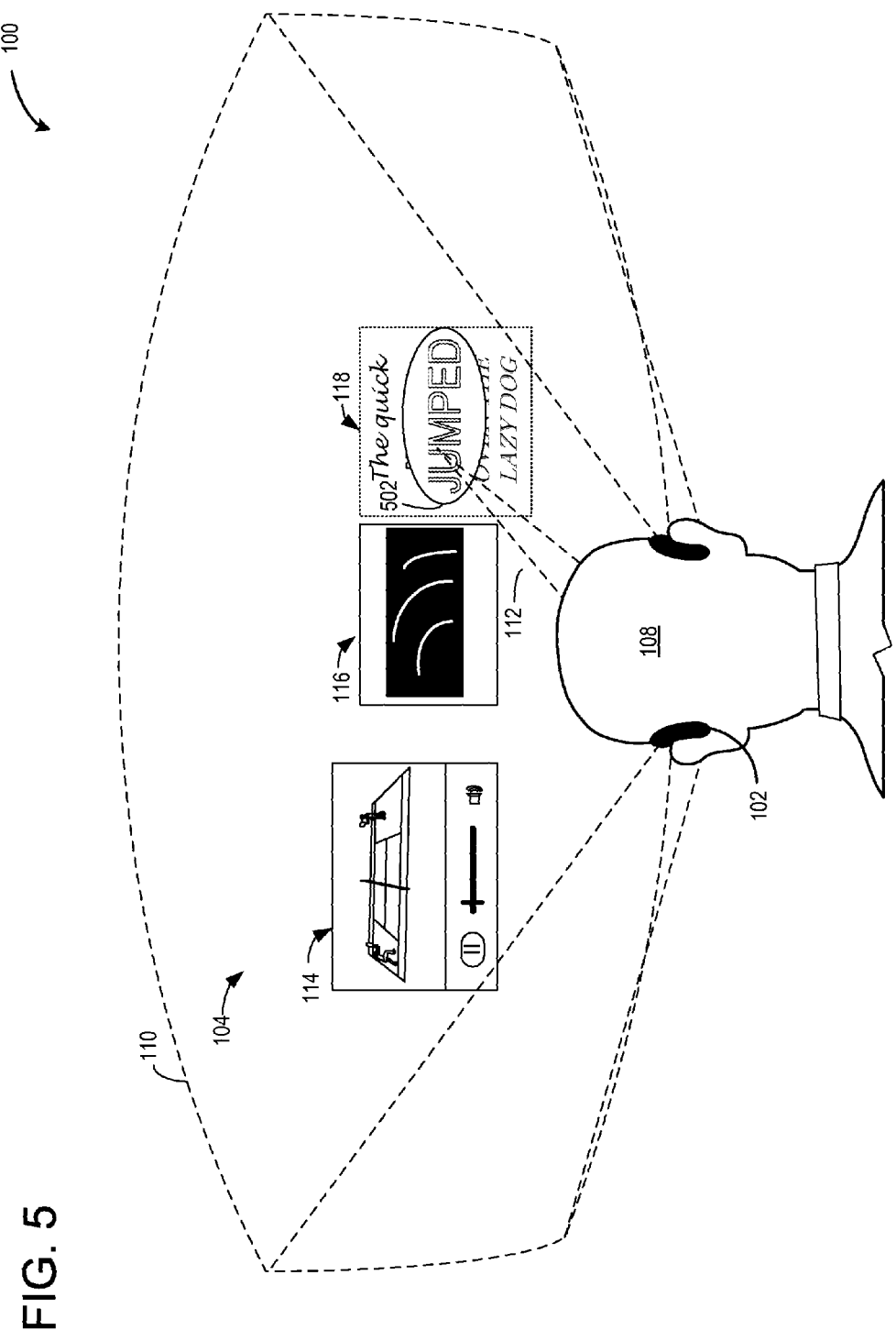

FIGS. 3-5 show additional examples of visual enhancements made to a user interface object. First, in FIG. 3, the user's gaze 112 is directed to the portion of the text item 118 including the words "the quick." As shown in FIG. 1, this text is presented on the graphical user interface a stylized font that utilizes stylized script-like lettering. If a visual pattern indicative of perception difficulty is detected, then the text may be displayed via a user interface object 302 in a different font and/or with other visual enhancements. For example, as illustrated in FIG. 3, the text including the words "the quick" has a larger font size and a different type of font than the original text in order to increase perceptibility with respect to the original form of the words.

FIG. 4 illustrates a visual enhancement configured to increase a contrast of text against a background color. The original version of the word "jumped" is light and difficult to read against a white background. As such, a user may have difficulty distinguishing the text from the background. Thus, the appearance (e.g. color, brightness, saturation, etc.) of the text and/or the background may be modified to increase a contrast of the text and background, and the resulting visually enhanced text may be displayed as user interface object 402. As another example, FIG. 5 shows a user interface object 502 that displays a portion of a text item having a different style of font (e.g., outline) than an original version of the text.

The examples illustrated herein are described for the purpose of example, and any other suitable visual enhancement or enhancements may be made to a user interface item, including but not limited to magnification. Furthermore, while the above-described figures illustrate visual enhancements made to text, it will be understood that similar alterations may be applied to action items, image items, video items, and/or any other suitable type of item.

Figure 6:
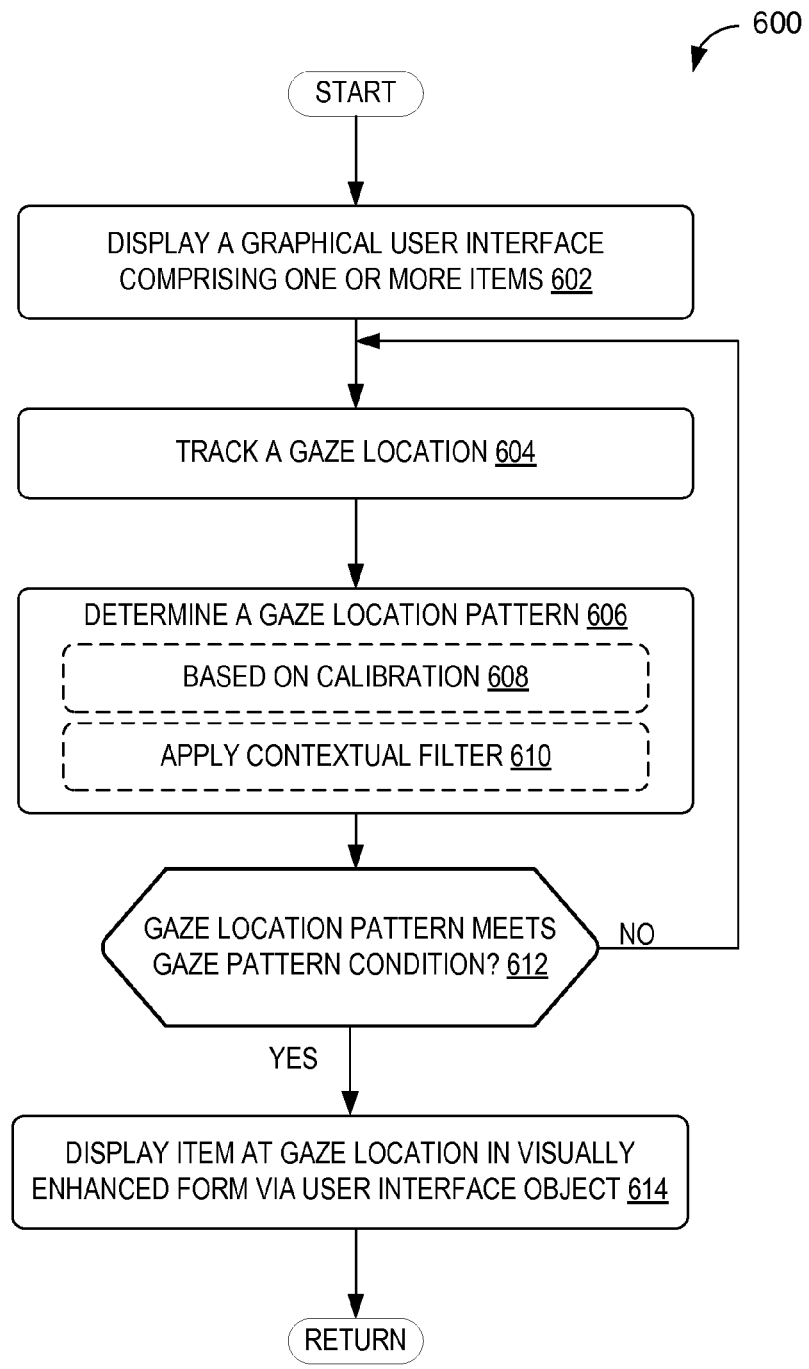
FIG. 6 is a flow diagram depicting an embodiment of a method of selectively enhancing a user interface item displayed on a display device.

FIG. 6 is a flow diagram that illustrates an embodiment of a method 600 of selectively enhancing content displayed on a display device. Method 600 comprises, at 602, displaying a graphical user interface comprising one or more items, and at 604, tracking a gaze location. As mentioned above, a computing device may comprise, or otherwise receive input from, a gaze tracking subsystem that provides a periodically updated location signal representing a determined location at which the user's gaze intersects a display. More information on an example gaze tracking subsystem is given below.

Method 600 further comprises, at 606, determining a gaze pattern from gaze path data that represents changes in the location of the position signal over a period of time. Gaze path data may include movements, dwells, combinations thereof, and/or other gaze path features. The gaze pattern may be determined from the gaze path data in any suitable manner. For example, the gaze pattern may be detected based upon a comparison of gaze path data to pre-defined patterns, to pre-defined conditions (e.g. gaze does not move beyond a selected number of pixels for a selected time), to prior detected patterns of the current user, to calibration data provided by the user during a calibration process as indicated at 608, and/or by use of classification functions trained with known gaze data. As a more specific example, the computing device may be calibrated to a current user via an automatic or semi-automatic calibration routine in which the user is instructed to perform one or more tasks relating to the perception of various items. The user may indicate a level of difficulty in perceiving the various items, and the tracked gaze patterns (and potentially contextual features of the items) may be compared to the indicated difficulty level to determine a gaze pattern condition. Statistical data relating gaze patterns of the user to levels of difficulty in perceiving items may thereby be collected for use in determining the confidence score.

In some embodiments, gaze patterns may be used to determine whether a user is having perception difficulties without considering any contextual data. In other embodiments, contextual data may be used along with gaze patterns to provide additional information for this determination. As such, method 600 may comprise applying a contextual filter to the gaze pattern determination, as indicated at 610. The contextual filter may be used with the determined gaze pattern, for example, to provide a confidence score based on one or more characteristics of an item at the gaze location as well as upon the determined gaze path.

Continuing, the gaze pattern may be evaluated in order to determine if it meets a gaze pattern condition, as indicated at 612. For example, the gaze pattern may be compared to predetermined paths and/or conditions, compared to prior user data, evaluated via a classification function, etc. Likewise, a confidence score may be compared to a threshold confidence score condition, and/or any other suitable evaluation may be utilized.

If the gaze pattern does not meet the gaze pattern condition, then method 600 returns to 604 to continue tracking a gaze location. On the other hand, if the gaze pattern condition is met, then method comprises, at 614, displaying an item at the gaze location in a visually enhanced form via a user interface object displayed separately from the item at the gaze location. For example, the user interface object may be displayed as an overlay of the original item (e.g. having a higher z-order position than the original item), and the item may be displayed therein with a magnified or otherwise altered appearance. In other embodiments, the user interface object may be displayed at a location that is spaced from the original item, and/or displayed in any other suitable manner.

The user interface object may persist for any suitable duration, and display of the user interface object may cease based upon any suitable events and/or conditions. For example, the computing device may cease to display the user interface object responsive to determining that the gaze is no longer directed to the gaze location and/or item. In other embodiments, the user may be able to move the user interface object to different locations, as if the user interface object were a lens that visually enhances any item located below the user interface object.

Figure 7:
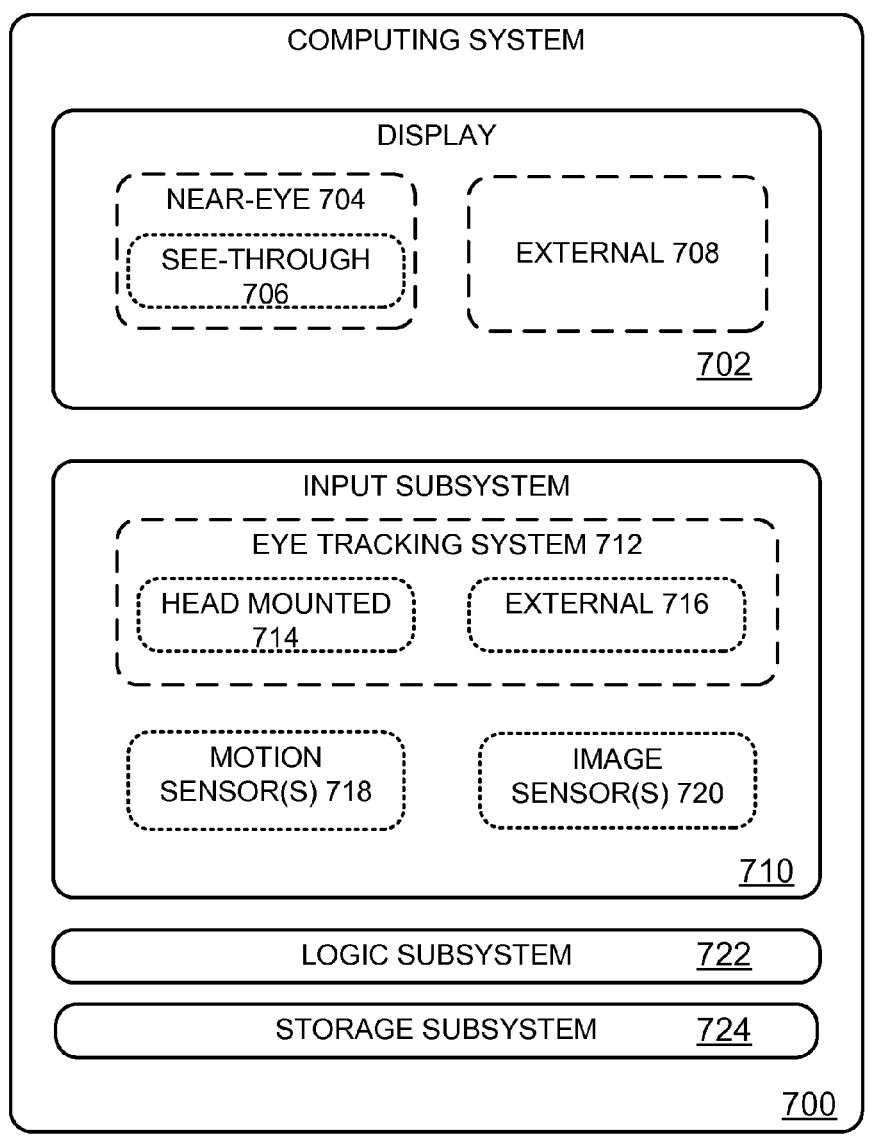
FIG. 7 shows a block diagram of an example display device in accordance with an embodiment of the present disclosure.

Method 600 may be performed via any suitable computing device that utilizes gaze tracking functionalities. FIG. 7 shows a block diagram of a computing system 700 comprising eye tracking functionality. The computing system 700 may represent the head-mounted display of FIG. 1, and/or any other suitable computing system configured to utilize a periodically updated position signal as an input. The computing system 700 includes a display 702 on which a graphical user interface may be displayed. The display 702 may take any suitable form. For example, in some embodiments, the computing system may include a near-eye display 704. Examples of near-eye display systems may include, but are not limited to head-mounted displays and handheld devices (e.g. smart phones, tablets, and/or other handheld devices having a near-eye display mode). In such devices, the near eye display may comprise a see-through display 706, or an opaque display. In other embodiments, the display may be external 708 to a computing device, such as in the case of a conventional monitor, television, or the like.

The computing system 700 further comprises an input subsystem 710 configured to receive an input of a periodically updated position signal from an eye tracking subsystem 712. In some embodiments, the eye tracking subsystem 712 may be head-mounted 714 (e.g. incorporated into a head-mounted near-eye display system) or otherwise incorporated into a computing device. In other embodiments, the eye tracking system may be external 716 to a computing device, such as in the case of an eye tracking system utilizing one or more cameras external to a conventional monitor or television used to display a graphical user interface.

The eye tracking system may utilize any suitable components. For example, in some embodiments, the eye tracking system may utilize one or more light sources configured to create glint reflections from the cornea of an eye, and one or more image sensors configured to acquire an image of the eye. A gaze direction may be determined from relative locations of the pupil of the eye and glints from the light sources. The gaze direction may be used, along with information regarding a distance from a user's eye to the display, to determine a location at which the gaze intersects the display. Such distance information may be based upon a predetermined estimate or calibration, or upon real-time depth information (e.g. from a stereo camera configuration).

Further, the input subsystem 710 may include other input mechanisms. For example, the input subsystem 710 may include one or more motion sensors 718 (e.g. incorporated into a head-mounted display or other portable device) and/or one or more image sensors 720 (e.g. one or more outward-facing image sensors, as well as inward-facing image sensors for eye tracking). It will be understood that these embodiments of user input devices that provide periodically updated positions signals are presented for the purpose of example, and are not intended to be limiting in any manner.

The computing system 700 also includes a logic subsystem 722, and a storage subsystem 724. The storage subsystem 724 may include stored instructions executable by the logic subsystem 722 to perform various tasks related to presenting a graphical user interface and receiving and processing gaze tracking information, for example, to identify potential instances in which a user struggles to view user interface items. Example computing systems are described in more detail below.

Figure 8:
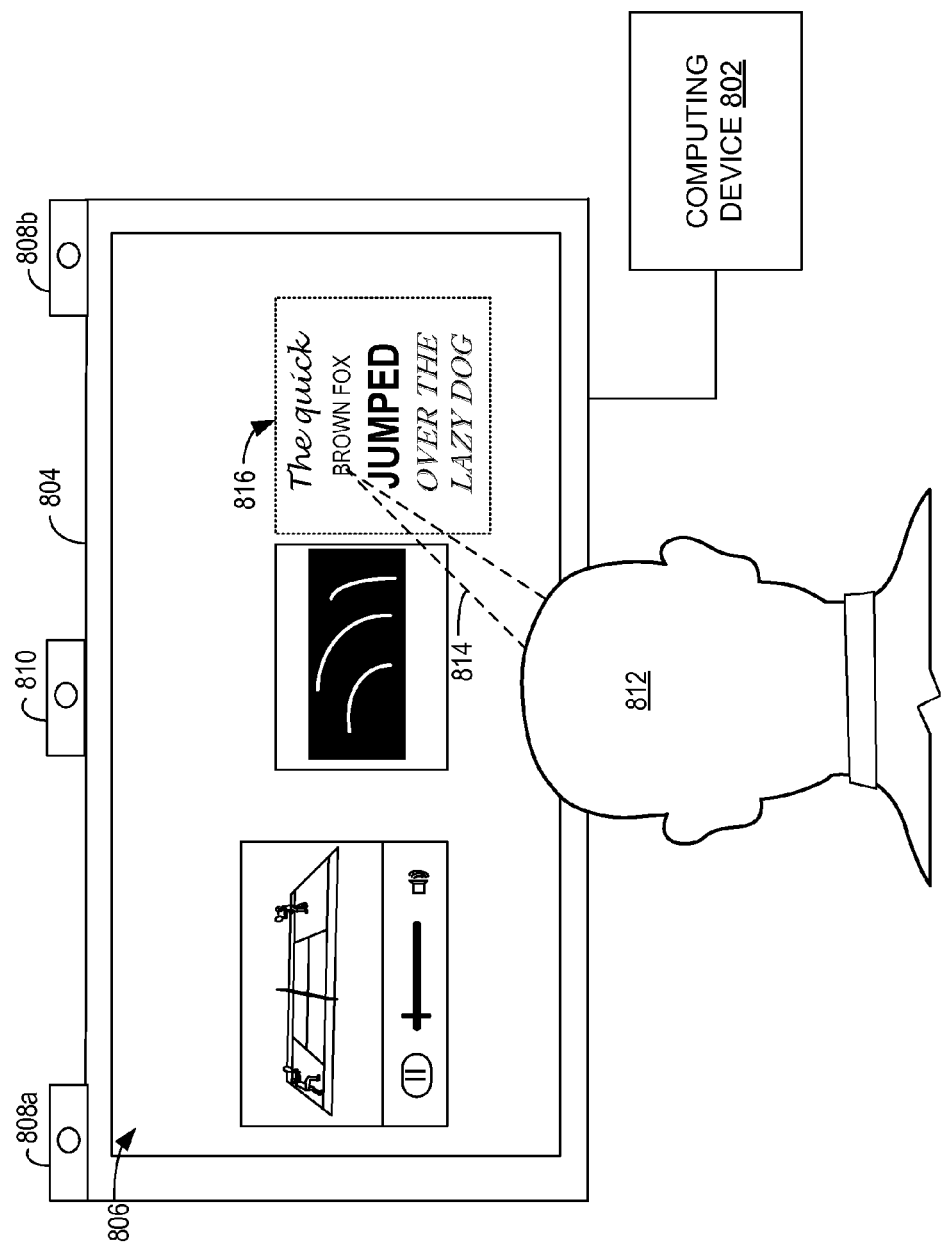
FIG. 8 schematically shows an example display device and graphical user interface in accordance with another embodiment of the present disclosure.
Figure 9:
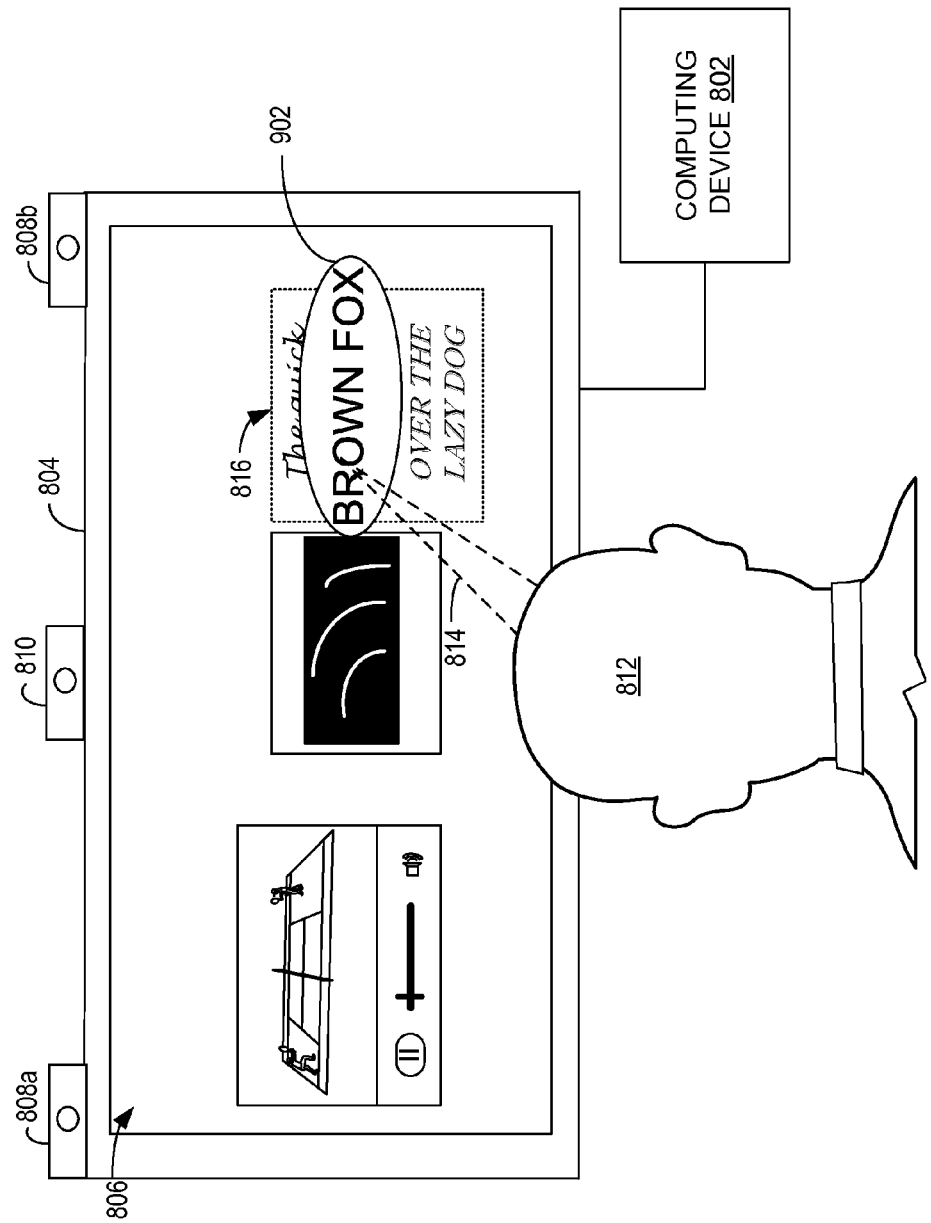
FIG. 9 schematically shows an example of visually enhancing user interface items of the graphical user interface of FIG. 8 in accordance with an embodiment of the present disclosure.

The examples of FIGS. 1-5 are shown in the context of a head-mounted display. However, gaze patterns may be used to detect user interface perceptibility issues in any suitable hardware context. FIGS. 8 and 9 illustrate another embodiment in which a gaze tracking subsystem includes cameras positioned in a fixed environmental location relative to a user, rather than being mounted to a head of a user. FIG. 8 shows a computing device 802 communicatively connected to a display device 804, such as a computer monitor or television. The computing device 802 is schematically depicted as being connected to one or more cameras 808a and 808b and a glint source 810. The cameras 808a and 808b may be arranged to provide images of a user 812 from known positions, and therefore allow a distance from the user's eye to the display to be determined. Further, the glint source 810 may be configured to emit a light toward the pupil of the user 812 for the detection of light reflected from the user's eye. This information may be used in combination with information regarding a location of a user's pupil to determine an eye gaze direction.

In FIG. 8, cameras 808a and 808b may detect that a gaze 814 of the user 812 is directed to a text item 816. Upon determining that a gaze pattern condition is met, the computing device may control the display device 804 to display a user interface object, as shown in FIG. 9 at 902, to visually enhance the appearance of the text to which the gaze 814 is directed.

Figure 10:
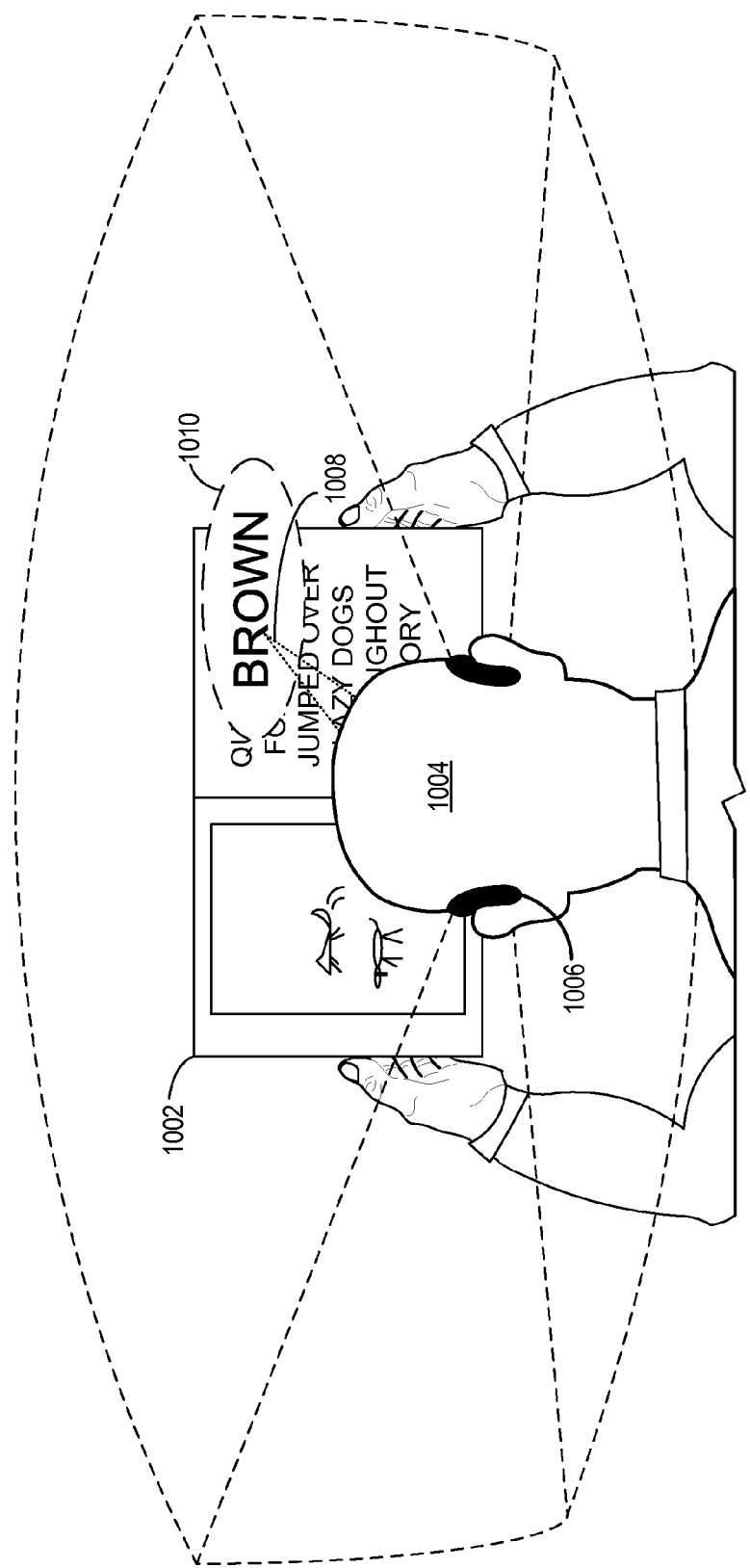
FIG. 10 schematically shows an example of visually enhancing a view of a physical object in accordance with an embodiment of the present disclosure.

Similar methods also may be used to enhance the appearance of physical objects being viewed via a see-through augmented reality display device. FIG. 10 illustrates an embodiment in which a physical object 1002 in the form of a book having text is viewed by a user 1004 through a head-mounted display 1006. A gaze tracking subsystem of the head-mounted display device 1006 may track the gaze 1008 of the user 1004. If the gaze tracking subsystem detects a gaze pattern that represents difficulty in perceiving an object, an image of the object at the gaze location (determined, e.g. by projecting determined gaze lines beyond the head mounted display into the physical environment) may be acquired via an imaging device integrated within the head-mounted display 1006 (and/or an imaging device positioned remotely from the head-mounted display 1006). The head mounted display device 1006 may then display a user interface object 1010 that visually enhances the appearance of the portion of the object 1002 to which the gaze 1008 is directed, for example, by displaying a magnified and/or otherwise altered view of the object or object portion. In the depicted embodiment, physical text at the location of user focus is displayed in magnified form via the user interface object 1010, but it will be understood that any suitable visual enhancement may be provided, including but not limited to those described above. As more specific examples, enhancements may include changing the brightness, contrast, and/or white balance of an image of the physical object in the user interface object 1010.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
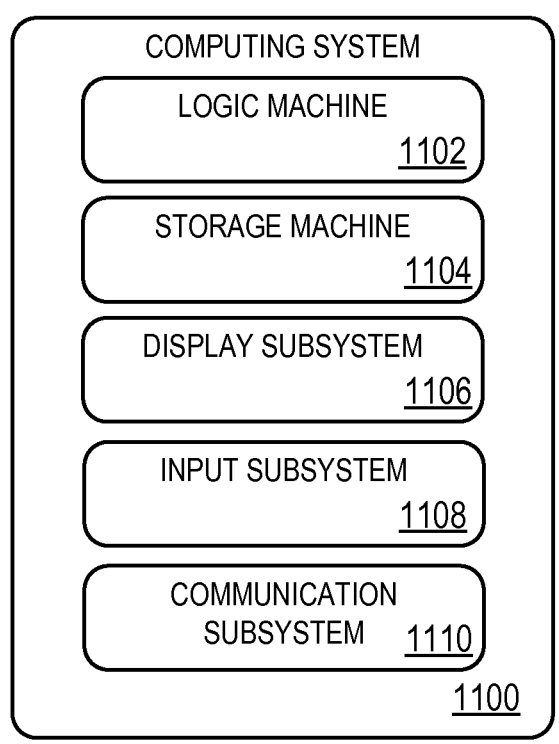
FIG. 11 is shows an example embodiment of a computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, wearable computers (e.g. head-mounted display devices), home-entertainment computers, network computing devices, gaming devices, mobile computing devices, mobile communication devices (e.g., smart phone), and/or other computing devices.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software and/or machine readable instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "engine" may be used to describe an aspect of computing system 1100 implemented to perform a particular function. In some cases, a module or engine may be instantiated via logic machine 1102 executing instructions held by storage machine 1104. It will be understood that different modules, programs, and/or engines may be instantiated from the same application, service, code block, object, library, routine, API, function, etc. Likewise, the same module and/or engine may be instantiated by different applications, services, code blocks, objects, routines, APIs, functions, etc. The terms "module" and "engine" may encompass individual or groups of executable files, data files, libraries, drivers, scripts, database records, etc.

When included, display subsystem 1106 may be used to present a visual representation of data held by storage machine 1104. This visual representation may take the form of a graphical user interface (GUI). For example, the display subsystem 1106 may be used to present the graphical user interface 104 of FIG. 1. As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method of selectively enhancing content displayed on a display device, the method comprising:
    displaying a graphical user interface comprising one or more items;
    tracking a change in a gaze location at which a gaze of a user intersects the graphical user interface over a period of time to determine a tracked gaze path;
    determining contextual information comprising a type of an item over which the tracked gaze path passes, the type of the item being selected from text and non-text;
    in response to determining that the item over which the tracked gaze path passes is text, determining one or more visual characteristics of the item; and
    analyzing the tracked gaze path to identify one or more gaze pattern conditions indicative of difficulty in perceiving an item in the tracked gaze path; and
    upon detecting a gaze pattern based upon the tracked gaze path that meets a pre-defined gaze pattern condition indicative of difficulty in perceiving the item in the tracked gaze path, displaying a visually enhanced form of the item in a user interface object displayed separately from the item, the visually enhanced form of the item including a first type of modification to the text when the text has a first visual characteristic as displayed, and the visually enhanced form including a second, different type of modification to the text when the text has a second visual characteristic as displayed.

2. The method of claim 1, wherein displaying the item in the tracked gaze path in the visually enhanced form comprises displaying the item in the tracked gaze path in a magnified form in response to determining that the item has a first characteristic including a font size that is smaller than a threshold.

3. The method of claim 1, wherein the first type of modification and the second, different type of modification each comprises a different one of: displaying the item in one or more of a different font, a different font style, a different font color, and/or against a different background color.

4. The method of claim 1, the method further comprising applying a contextual filter to determine a likelihood of the user having difficulty in perceiving the item.

5. The method of claim 4, wherein applying the contextual filter comprises determining a confidence score via the contextual filter, and wherein the one or more pre-defined gaze pattern conditions comprises a condition in which the confidence score meets a threshold condition.

6. The method of claim 4, wherein the characteristics of the item include one or more of a font size, a font type, a font style, a font color, and a background color, and wherein applying the contextual filter further comprises applying the contextual filter based upon one or more of the font size, the font type, the font style, the font color, and the background color of the item.

7. The method of claim 1, wherein detecting the gaze pattern comprises one or more of comparing gaze path data to pre-defined gaze patterns, and comparing gaze path data to prior patterns of a current user.

8. The method of claim 1, further comprising ceasing display of the user interface object in response to detecting that the gaze of the user has moved from the item.

9. The method of claim 1, wherein the item in the tracked gaze path comprises one or more of image data and video data, and further comprising selectively displaying the item in the tracked gaze path in the visually enhanced form based on characteristics of the one or more of the image data and video data.

10. A computing device, comprising:
a display device;
a gaze tracking subsystem;
a logic machine; and
a storage machine storing instructions executable by the logic machine to:
display on the display device a graphical user interface comprising one or more items;
track via the gaze tracking system a change in a gaze location at which a gaze of the user intersects the graphical user interface over a period of time to determine a tracked gaze path;
determine a characteristic of an item in the tracked gaze path;
analyze the tracked gaze path to identify a gaze pattern condition indicative of difficultly in perceiving the item in the tracked gaze path; and
upon detecting a gaze pattern based upon the tracked gaze path that meets a defined gaze pattern condition indicative of difficulty in perceiving the item in the tracked gaze path, display a visually enhanced appearance of the item in the tracked gaze path via a user interface object displayed separately from the item, the visually enhanced appearance of the item including a first modification of the item responsive to determining that the item has a first characteristic, and the visually enhanced appearance of the item including a second, different modification of the item responsive to determining that the item has a second, different characteristic.

11. The computing device of claim 10, wherein the computing device comprises a head-mounted display device.

12. The computing device of claim 10, wherein the gaze tracking subsystem is at a fixed environmental location relative to a user.

13. The computing device of claim 10, wherein the instructions are further executable to detect a gaze pattern by one or more of comparing gaze path data to prior patterns of a current user and evaluating gaze path data via a classification function.

14. The computing device of claim 10, wherein the instructions are executable to display the item at the gaze location with the visually enhanced appearance by displaying the item with a magnified appearance in response to determining that the item has a characteristic including a size that is smaller than a threshold, and wherein the instructions are executable to display the item in a first font type in response to determining that the item has a characteristic including a second font type.

15. The computing device of claim 10, wherein the item at the gaze location is a text item, and wherein the instructions are executable to display the item at the gaze location with the visually enhanced appearance by displaying the text item in one or more of a different font size, a different font style, a different font color, and/or against a different background color based on the determined characteristic of the text item and the tracked gaze path.

16. The computing device of claim 10, wherein the item at the gaze location comprises one or more of a video item and an image item.

17. On a computing device, a method of selectively enhancing an appearance of an object, the method comprising:
determining whether a type of the object is or is not a text type;
tracking a change in a gaze location at which a gaze of a user intersects the object over a period of time to determine a tracked gaze path;
analyzing the tracked gaze path to identify a gaze pattern condition indicative of difficulty in perceiving an item in the tracked gaze path;
detecting a gaze pattern based upon the tracked gaze path that meets a defined gaze pattern condition indicative of difficulty in perceiving the item in the tracked gaze path;
when the object is determined to be a text object, determining a characteristic of the object, and displaying on a graphical user interface an image including a visually enhanced form of the object via a user interface object displayed separately from the object at the gaze location, the visually enhanced form of the object including a first modification of the object in response to determining that the object has a first characteristic and the visually enhanced form of the object including a second, different modification of the object in response to determining that the object has a second characteristic; and
when the object is determined not to be a text object, not displaying on the graphical user interface the image of the object in the visually enhanced form.

18. The method of claim 17, wherein the object comprises a virtual object displayed on the graphical user interface, wherein the characteristic of the object comprises one or more of a font size, a font style, a font color, and a background color.

19. The method of claim 17, wherein the object comprises a physical object viewable through a see-through display of the computing device.

20. The method of claim 17, wherein the computing device comprises a head-mounted display device.

* * * * *